US010933839B2

(12) United States Patent
Jaradi et al.

(10) Patent No.: US 10,933,839 B2
(45) Date of Patent: Mar. 2, 2021

(54) VEHICLE RESTRAINT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 16/190,373

(22) Filed: Nov. 14, 2018

(65) Prior Publication Data

US 2020/0148161 A1 May 14, 2020

(51) Int. Cl.
| | |
|---|---|
| *B60R 22/20* | (2006.01) |
| *B60R 22/24* | (2006.01) |
| *B60N 2/14* | (2006.01) |
| *B60R 22/46* | (2006.01) |
| *B60R 22/48* | (2006.01) |
| *B60R 22/18* | (2006.01) |

(52) U.S. Cl.
CPC .............. *B60R 22/205* (2013.01); *B60N 2/14* (2013.01); *B60R 22/24* (2013.01); *B60R 22/46* (2013.01); *B60R 22/48* (2013.01); *B60R 2022/1818* (2013.01); *B60R 2022/4666* (2013.01); *B60R 2022/4808* (2013.01)

(58) Field of Classification Search
CPC ....... B60R 22/24; B60R 25/06; B60R 22/023; B60R 22/34
USPC .............................................. 280/801.1, 806
See application file for complete search history.

(56) References Cited

U.S. PATENT DOCUMENTS

| | | | |
|---|---|---|---|
| 3,554,577 A | 1/1971 | Hane | |
| 3,971,569 A * | 7/1976 | Abe | B60R 21/18 280/733 |
| 4,984,822 A * | 1/1991 | Shimizu | B60N 2/34 280/804 |
| 5,482,354 A | 1/1996 | Gryp | |
| 5,909,926 A | 6/1999 | Gonzalez | |
| 5,951,106 A * | 9/1999 | Hirama | B60N 2/146 297/344.22 |
| 6,234,529 B1 | 5/2001 | Ellison et al. | |
| 6,406,059 B1 * | 6/2002 | Taubenberger | B60R 21/18 280/733 |
| 6,572,172 B1 | 6/2003 | Ninomiya et al. | |
| 6,722,737 B2 | 4/2004 | Kanai | |
| 7,819,429 B2 * | 10/2010 | Amano | B60R 22/24 280/801.1 |
| 8,336,914 B2 * | 12/2012 | Ito | B60R 22/24 280/801.1 |
| 9,096,150 B2 | 8/2015 | Cuddihy et al. | |
| 9,180,792 B2 * | 11/2015 | Haller | B60N 2/508 |
| 9,227,529 B2 * | 1/2016 | Haller | B60N 2/508 |
| 10,486,558 B1 * | 11/2019 | Baccouche | B60N 2/005 |

(Continued)

FOREIGN PATENT DOCUMENTS

WO 2016021051 A1 2/2016

*Primary Examiner* — Toan C To
(74) *Attorney, Agent, or Firm* — Frank A. MacKenzie; Bejin Bieneman PLC (57) ABSTRACT

A system includes a vehicle roof. A track is fixed to the vehicle roof. A seatbelt retractor is engaged with the track and is movable relative to the vehicle roof along the track. The seatbelt retractor may be selectively positioned relative to the vehicle roof.

20 Claims, 10 Drawing Sheets (56) References Cited

U.S. PATENT DOCUMENTS

| | | | |
|---|---|---|---|
| 2005/0017497 A1* | 1/2005 | Hirotani | B60R 22/023 |
| | | | 280/807 |
| 2006/0001253 A1 | 1/2006 | Lee | |
| 2006/0091666 A1* | 5/2006 | Amold | B60R 22/203 |
| | | | 280/801.2 |
| 2007/0246635 A1* | 10/2007 | Nakajima | H05K 7/20927 |
| | | | 248/637 |
| 2009/0051155 A1 | 2/2009 | Amano | |
| 2016/0362083 A1* | 12/2016 | Taylor | B60R 22/12 |
| 2017/0028965 A1* | 2/2017 | Ohno | B60R 22/26 |
| 2019/0248322 A1* | 8/2019 | Herzenstiel | B60R 21/2338 |

* cited by examiner

VEHICLE RESTRAINT SYSTEM

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. There remains an opportunity to design vehicle amenities for the occupants that takes into account the reduced operation monitoring provided by the autonomous vehicle.

DETAILED DESCRIPTION

A system includes a vehicle roof, a track fixed to the vehicle roof, and a seatbelt retractor engaged with the track. The seatbelt retractor is movable relative to the vehicle roof along the track.

The system may include a seat rotatable about an axis that extends through the seat and the vehicle roof. The system may include a seatbelt webbing extending from the seatbelt retractor to the seat. The seatbelt webbing may include an end anchored to the seat. The seat may include a seat back having an upper end and a webbing guide at the upper end. The system may include a seatbelt webbing extending from the retractor through the webbing guide.

The system may include a vehicle floor and a seat track fixed to the vehicle floor. The seat may be rotatable relative to the seat track. The system may include a solenoid fixed to one of the seat and the seat track and releasably engageable with the other of the seat and the seat track. The system may include a processor and a memory storing instructions to actuate the solenoid in response to operation of a switch. The system may include a second solenoid fixed to the seatbelt retractor and releasably engageable with the track. The system may include a processor and a memory storing instructions to simultaneously actuate the solenoid and the second solenoid in response to operation of a switch.

The track may be continuous.

The system may include a bearing between the track and the seatbelt retractor.

The system may include a solenoid fixed to the seatbelt retractor and releasably engageable with the track. The system may include a processor and a memory storing instructions to actuate the solenoid in response to operation of a switch. The system may include a processor and a memory storing instructions to actuate the solenoid in response to a vehicle impact.

A system may include a track, a seatbelt retractor slideably engaged with the track, and a solenoid fixed to one of the seatbelt retractor and the track and releasably engageable with the other of the seatbelt retractor and the track.

The system may include a processor and a memory storing instructions to actuate the solenoid in response to operation of a switch.

The system may include a processor and a memory storing instructions to actuate the solenoid in response to a vehicle impact. The track may be circular.

With reference to the Figures, wherein like numerals indicate like parts throughout the several views, a system 12 of a vehicle 10 includes a vehicle roof 14 and a track 16 fixed to the vehicle roof 14. The system 12 includes a seatbelt retractor 18 engaged with the track 16 and movable relative to the vehicle roof 14 along the track 16.

In one example discussed below, the system 12 may include a seat 20 that is rotatable. As the seat 20 rotates, the seatbelt retractor 18 moves with the seat 20 relative to the vehicle roof 14 along the track 16. In addition to allowing movement with the seat 20, the engagement of the seatbelt retractor 18 with the track 16 fixed to the vehicle roof 14 avoids the cost and weight associated with a seat-integrated restraint (SIR).

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

Figure 1:
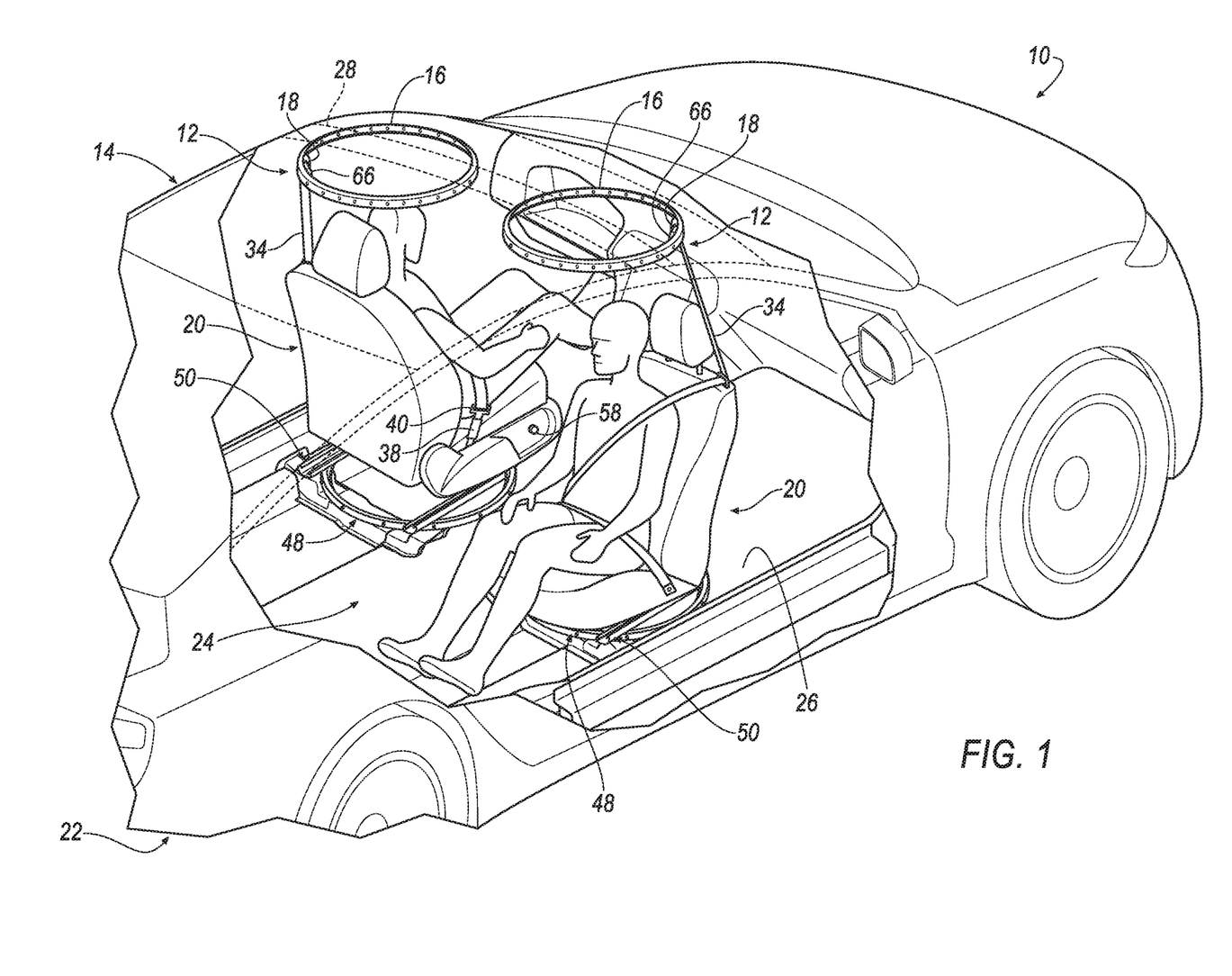
FIG. 1 is a partial cut-away view of a vehicle including two seats and corresponding seatbelt retractors in tracks fixed to a vehicle roof.
Figure 2:
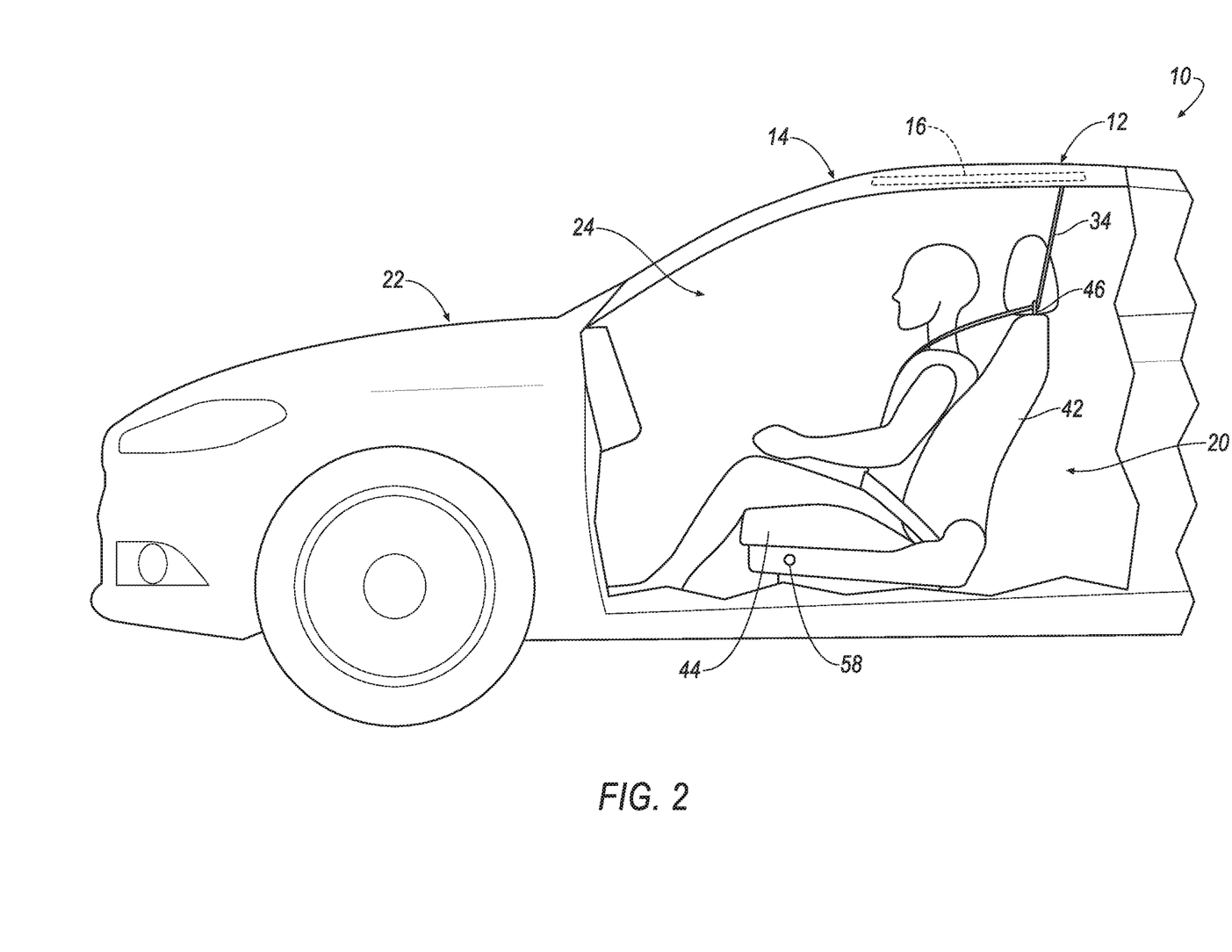
FIG. 2 is a side view of the vehicle.

With reference to FIG. 1, the vehicle 10 includes a body 22. The body 22 may be of a unibody construction in which the body 22, e.g., rockers, also serves as a frame, and the body 22 (including rockers, pillars, roof rails, etc.) is unitary. As another example, the body 22 and frame may have a body-on-frame construction (also referred to as a cab-on-frame construction) in which the body 22 and frame are separate components, i.e., are modular, and the body 22 is supported on and affixed to the frame. Alternatively, the body 22 may have any suitable construction. The body 22 may be of any suitable material, for example, steel, aluminum, and/or fiber-reinforced plastic, etc.

The body 22 of the vehicle 10 defines a passenger cabin 24. The passenger cabin 24 houses occupants, if any, of the vehicle 10. The passenger cabin 24 includes a front end and a rear end with the front end being in front of the rear end during forward movement of the vehicle 10.

The body 22 includes a vehicle floor 26. The vehicle floor 26 may define the lower boundary of the passenger cabin 24 and may extend from the front end of the passenger cabin 24 to the rear end of the passenger cabin 24. The vehicle floor 26 may include a floor panel and upholstery on the vehicle floor 26 panel. The upholstery may be, for example, carpet, and may have a class-A surface facing the passenger compartment, i.e., a surface specifically manufactured to have a high quality, finished, aesthetic appearance free of blemishes. The vehicle floor 26 may include cross-beams (not shown) connected to the panel and to other components of the vehicle 10 body 22 and/or frame.

The body 22 includes the vehicle roof 14. The vehicle roof 14 is above the vehicle floor 26. The vehicle roof 14 may include a panel having outer surface at an exterior of the vehicle 10 and an inner surface facing toward the passenger cabin 24. The roof may include a roof beam 28 adjacent the panel and extending between roof rails.

The vehicle 10 may include a headliner 30 supported by the vehicle 10 body 22, e.g., the vehicle roof 14. The headliner 30 may define the upper boundary of the passenger cabin 24 and may extend from the front end of the passenger cabin 24 to the rear end of the passenger cabin 24. The headliner 30 is below the vehicle roof 14 between the vehicle roof 14 and the passenger cabin 24. The headliner 30 may include a class-A surface facing the passenger compartment, i.e., a surface specifically manufactured to have a high quality, finished, aesthetic appearance free of blemishes.

Figure 3:
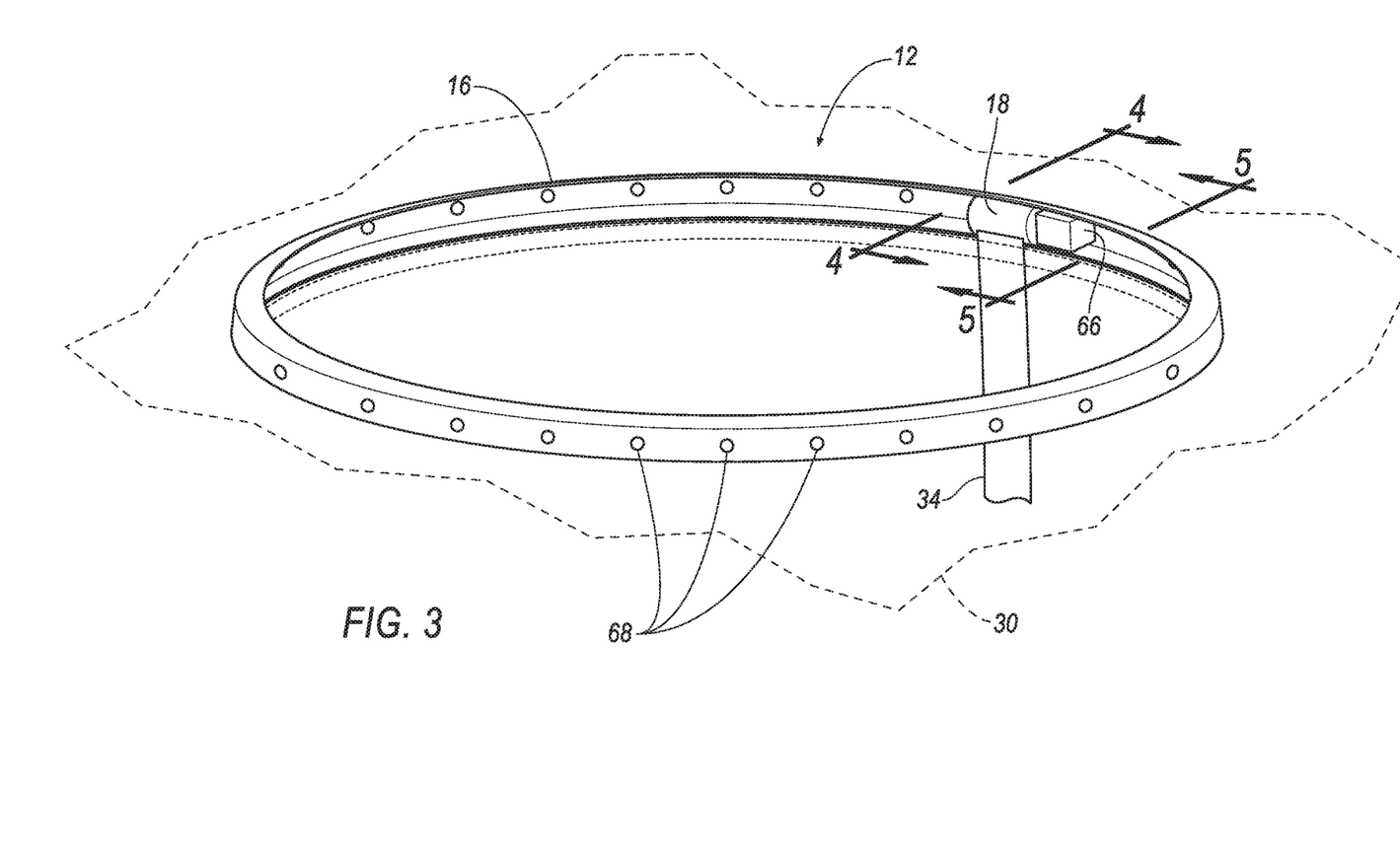
FIG. 3 is a perspective view of the track and the seatbelt retractor above a headliner.
Figure 4:
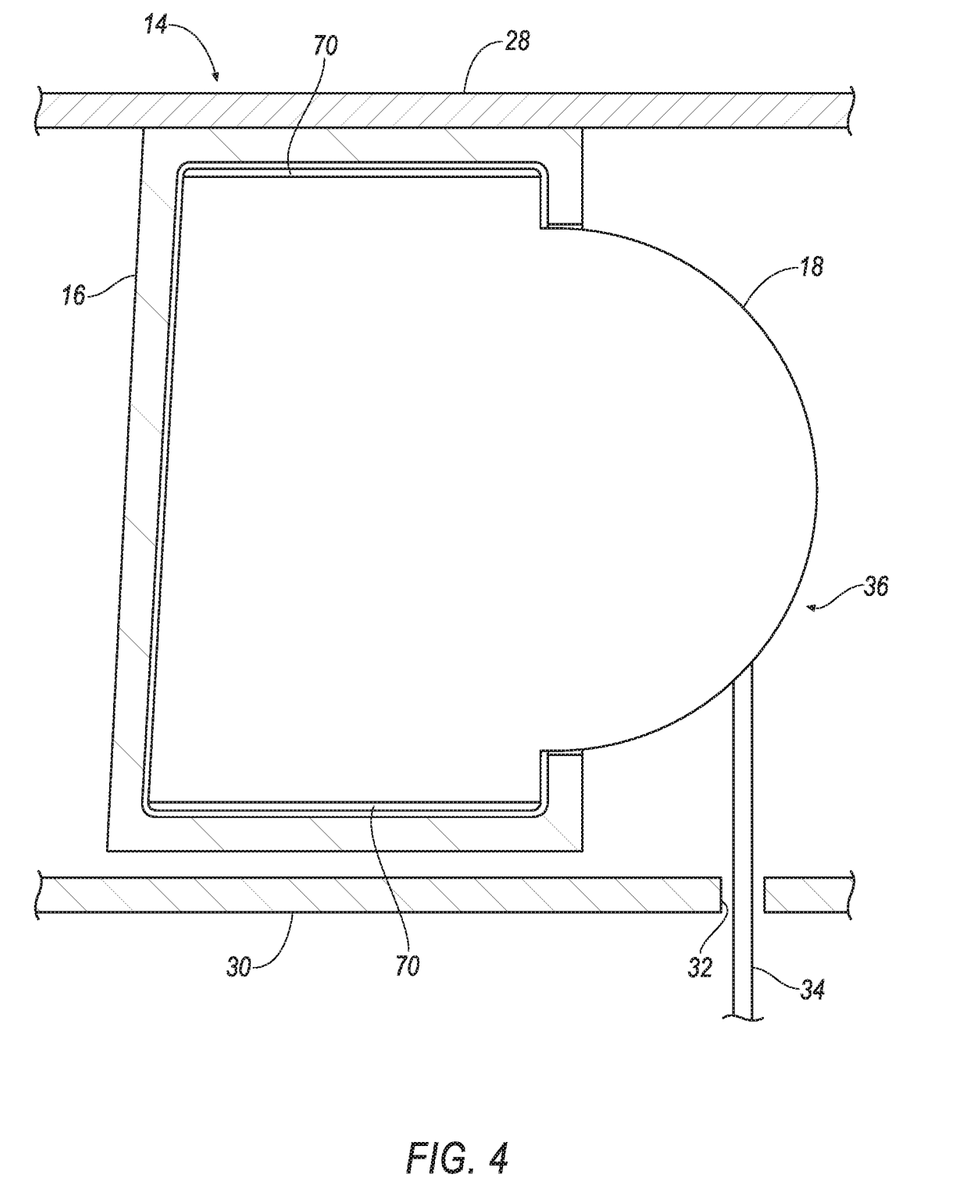
FIG. 4 is a cross-sectional view along line 4 of FIG. 3.
Figure 5A:
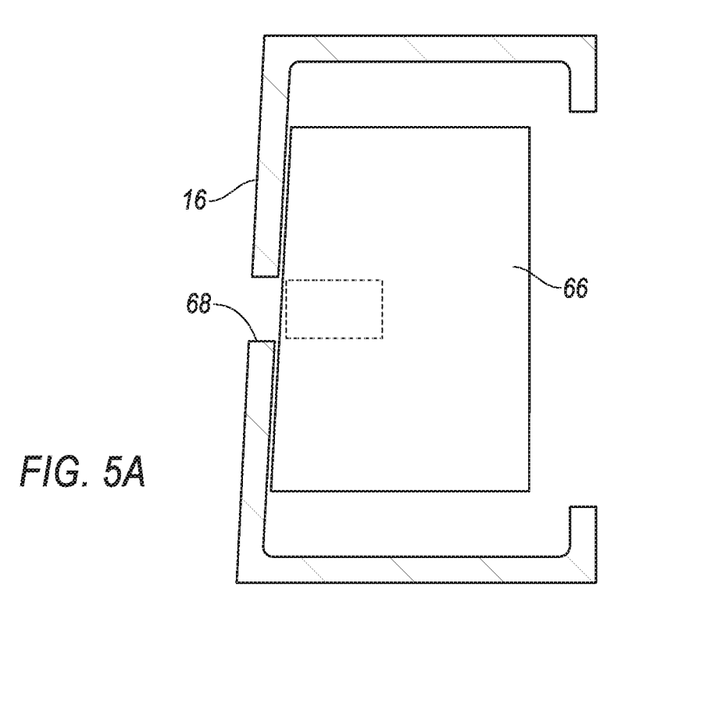
FIG. 5A is a cross-sectional view along line 5 of FIG. 3 when a solenoid on the seatbelt retractor is disengaged with the track.
Figure 5B:
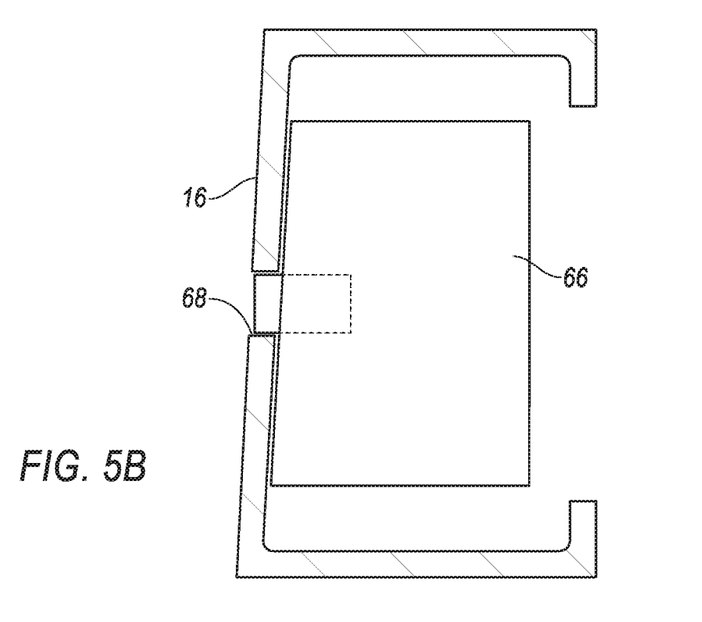
FIG. 5B is a cross-sectional view along line 5 of FIG. 3 when the solenoid is engaged with the track.

The headliner 30 may conceal the track 16 and the seatbelt retractor 18. As shown in FIGS. 3 and 4, the headliner 30 may include a passage 22 and seatbelt webbing 34 extends through the passage 22. The passage 22 may have the same shape as the track 16.

The vehicle 10 includes a seatbelt assembly 36. The seatbelt assembly 36 includes the seatbelt retractor 18 and the seatbelt webbing 34 extending from the seatbelt retractor 18 to the seat 20. The seatbelt webbing 34 extends from the seatbelt retractor 18 to the seat 20. Specifically, the seatbelt webbing 34 has an end anchored to the seat 20 and the other end of the seatbelt webbing 34 feeds into the seatbelt retractor 18, which may include a spool that extends and retracts the seatbelt webbing 34. In other words, the seatbelt webbing 34 is retractably extendable from the seatbelt retractor 18. The spool may be spring loaded to retract the seatbelt webbing 34. The seatbelt retractor 18 may be of any suitable type The seatbelt retractor 18 may releasably lock the seatbelt webbing 34 to temporarily prevent extraction of the seatbelt webbing 34 during sudden acceleration of the occupant. For example, the seatbelt retractor 18 may include a weighted pendulum, a pawl/ratchet gear, a clutch, etc., which triggers to releasably lock the seatbelt webbing 34. The seatbelt retractor 18 may unlock the seatbelt webbing 34 when force is removed from the seatbelt webbing 34 to again allow for extraction and retraction of the seatbelt webbing 34.

The seatbelt assembly 36 includes a buckle 38 fixed to the seat 20, e.g., a seat bottom 44, and a clip 40 that slides freely along the seatbelt webbing 34. The clip 40 is releasably engageable with the buckle 38. The seatbelt assembly 36 may be a three-point harness, e.g., when engaged with the buckle 38, the clip 40 divides the seatbelt webbing 34 into a lap band and a shoulder band.

As set forth above, the vehicle 10 includes at least one seat 20. Specifically, the vehicle 10 may include any suitable number of seats 20. In examples including more than one seat 20, the vehicle 10 may include one or more seatbelt assemblies 36, e.g., a seatbelt assembly 36 for each seat 20. The seats 20 may be arranged in any suitable arrangement. For example, one or more of the seats 20 may be at the front end of the passenger cabin 24, i.e., a front seat, and/or one or more of the seats 20 may be at the rear end of the passenger cabin 24, i.e., a rear seat.

The seat 20 may include a seat back 42 and the seat bottom 44. The seat back 42 may be supported by the seat bottom 44 and may be stationary or movable relative to the seat bottom 44. The seat back 42 and the seat bottom 44 may be adjustable in multiple degrees of freedom. The seat back 42 and the seat bottom 44 support the occupant in the seat 20. The seatbelt webbing 34 may be anchored, for example, to the seat bottom 44.

The seat back 42 has an upper end and a lower end end, as shown in FIG. 1. The upper end may support a head restraint.

The seat bottom 44 and/or the seat back 42 may include a frame and a covering supported on the frame. The frame may include tubes, beams, etc. The frame may be any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The covering of the seat 20 may include upholstery and padding. The upholstery may be cloth, leather, faux leather, or any other suitable material. The upholstery may be stitched in panels around the frame. The padding may be between the covering and the frame and may be foam or any other suitable material. The covering may include a class-A surface.

The seat back 42 may include a webbing guide 46 fixed to the frame of the seat back 42. The seatbelt webbing 34 extends through the webbing guide 46, i.e., the webbing guide 46 includes a slot through which the webbing guide 46 extends through. As the seat 20 rotates, as described below, the webbing guide 46 pulls the seatbelt retractor 18 along the track 16 such that the seatbelt retractor 18 moves with the seat 20 when the seat 20 is rotated.

The seat 20 is rotatable relative to the vehicle floor 26 about an axis that extends through the seat 20 and the vehicle roof 14. In other words, the seat 20 is rotatable to face in different directions. For example, one seat 20 in Figured 1 is facing forwardly and the other seat 20 in FIG. 1 is facing rearwardly. The seat 20 may rotate completely i.e. 360° about the axis. The seat 20 may rotate to face any number of directions.

As one example, the seat 20 includes a base 48 mounted to the vehicle floor 26 and a seat track 50 mounted to the base 48. The seat track 50 may be supported on the base 48 and the seat bottom 44 may be supported on the seat track 50.

The base 48 may be rotatable relative to the vehicle floor 26. The base 48 may be of any suitable configuration. As one example, the base 48 may include a fixed ring 52 and a rotatable ring 54. The fixed ring 52 is fixed to the vehicle floor 26, i.e., the fixed ring 52 does not move relative to the vehicle floor 26. The fixed ring 52 absorbs loads from the rotatable ring 54, e.g., during the vehicle 10 impact, and transfers loads to the vehicle floor 26.

The rotatable ring 54 is concentric with the fixed ring 52, i.e., the fixed ring 52 and the rotatable ring 54 share a common center point. The rotatable ring 54 is rotatably supported by the fixed ring 52. The rotatable ring 54 rotates relative to the fixed ring 52, allowing the seat 20 to rotate relative to the fixed ring 52.

The base 48 may be movable to a released position to allow rotation of the seat 20 relative to the vehicle floor 26 and a locked position to prevent rotation of the seat 20 relative to the vehicle floor 26. The base 48 may be automatically or manually moved between the released position and the locked position. For example, the seat 20 may include a solenoid 56 that engages/disengages another component of the seat 20 to change the base 48 between the locked position and the released position. The solenoid 56 may be actuated by a switch 58. The switch 58 may be on the seat 20. The switch 58 may be any suitable type of switch that receives input from the occupant e.g., a finger-operated mechanical switch, a graphical user interface, etc. As another example, the base 48 may be manually moved between the released position and the locked position. For example, the seat 20 may include a manually-operable mechanism such as use of a lever, button release, cable release, etc.

As one example of the base 48 being movable between the released position, the rotatable ring 54 may be releasably locked to the fixed ring 52. In such an example, the fixed ring 52 and the rotatable ring 54 may be automatically locked, e.g., with the solenoid 56. As another example, the fixed ring 52 and the rotatable ring 54 may be manually locked and unlocked with a manually-operable mechanism such as use of a lever, button release, cable release, etc.

Figure 8:
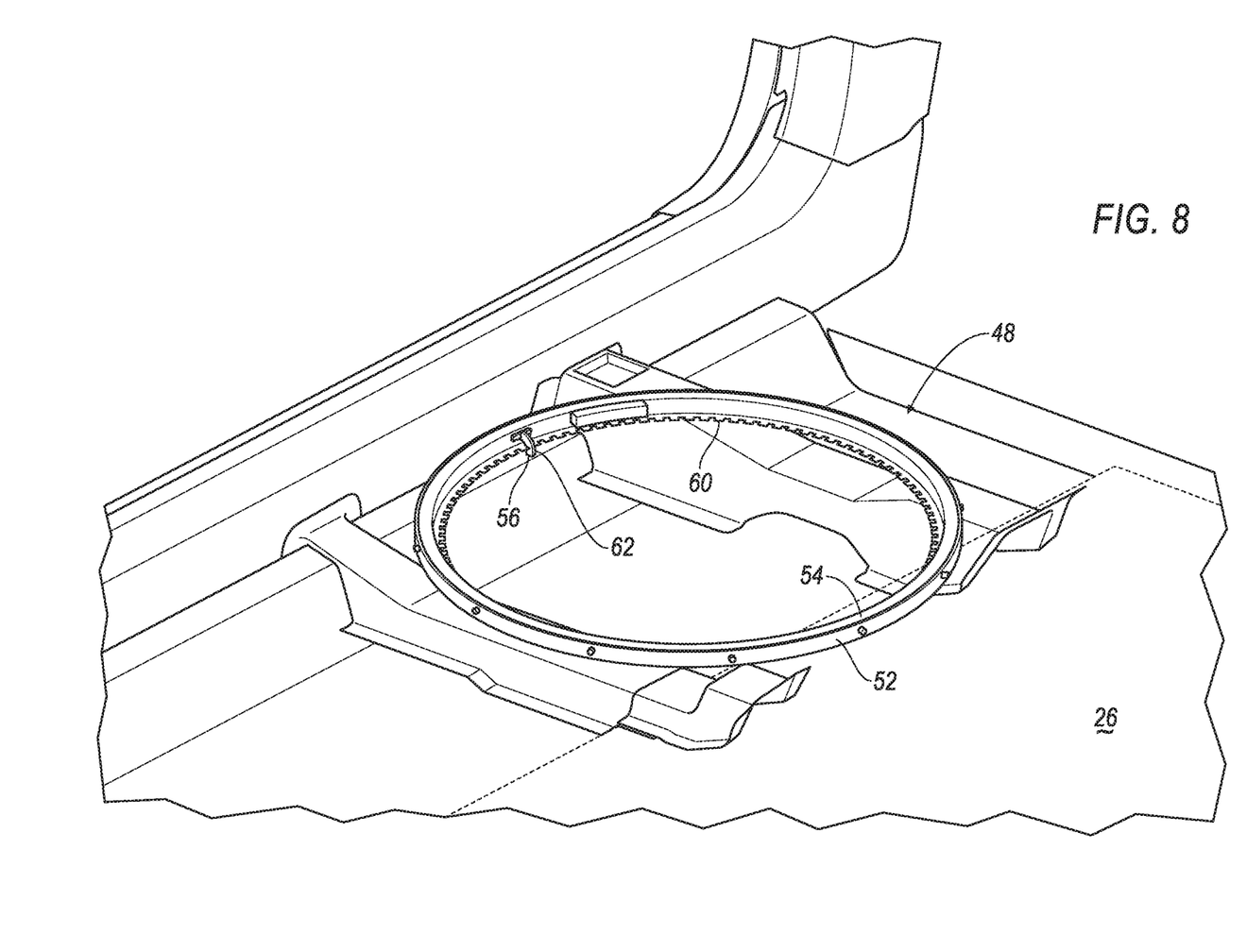
FIG. 8 is a perspective view of a base of the seat mounted to a vehicle floor.

For example, one of the fixed ring 52 and the rotatable ring 54 may have a plurality of teeth 60 and a latch 62 may be movably supported by the other of the fixed ring 52. The latch 62 is releasably engageable with the teeth 60. The latch 62 is designed to prevent movement of the rotatable ring 54 relative to the fixed ring 52. As shown in FIG. 8, the latch 62 may extend into one of the gaps between two of the teeth 60. When the latch 62 is in one of the gaps and the rotatable ring 54 rotates, the latch 62 engages one of the teeth 60 defining the gap, preventing movement of the rotatable ring 54. Thus, the latch 62 secures the rotatable ring 54 relative to the fixed ring 52, securing the seat 20 at a position defined by the gap in which the latch 62 is disposed. Upon rotating the seat 20 to a desired position, the occupant may move the latch 62 into one of the gaps, preventing rotation of the rotatable ring 54.

The latch 62, for example, may be automatically moved into engagement with the teeth 60. For example, the latch 62 may be connected to the solenoid 56 to move the latch 62 into one of the gaps, e.g., the latch 62 may be the armature of the solenoid 56. As another example, the manually-operable mechanism may be connected to the latch 62 to move the latch 62 into and out of one of the gaps.

When the base 48 is in the released position, the seat 20 may be rotated relative to the vehicle floor 26 manually or automatically. As one example, the seat 20 may include a motor 64 that rotates the seat 20 relative to the vehicle floor 26. For example, the motor 64 may move the rotatable ring 54 relative to the fixed ring 52. The motor 64 may engage the teeth 60 of the rotatable ring 54 or any suitable feature of the rotatable ring 54 to rotate the rotatable ring 54 relative to the fixed ring 52. As an example where the seat 20 is manually rotated relative to the vehicle floor 26, when the base 48 is in the released position, an occupant of the seat 20 may manually move the seat 20 with their legs and/or arms.

The seat track 50 supports the seat bottom 44 on the base 48, e.g., on the rotatable ring 54. The seat 20 is selectively slidable relative to the seat track 50. In other words, the occupant may slide the seat bottom 44 along the seat track 50 and may secure the seat bottom 44 to the seat track 50 at a selected position. The seat bottom 44 may be moved automatically or manually relative to the track 16.

As set forth above, the track 16 is fixed to the vehicle roof 14, i.e., the track 16 does not move relative to the vehicle roof 14. The track 16 may be directly or indirectly connected to the vehicle roof 14 in any suitable manner. As an example, the track 16 may be fixed to the roof beam 28 of the vehicle roof 14. The track 16 may be between the vehicle roof 14 and the headliner 30. In such an example, the track 16 may be partially or entirely concealed by the headliner 30.

The track 16 may be continuous, i.e., with no beginning and no end. As an example, the track 16 may be circular, oval, etc.

The seatbelt retractor 18 is engaged with the track 16. In other words, the seatbelt retractor 18 is retained in the track 16 and is slidable along the track 16. The track 16 may include lips that retain the seatbelt retractor 18 in the track 16.

The seatbelt retractor 18 is movable relative to the vehicle roof 14 along the track 16. In other words, the track 16 remains stationary relative to the vehicle roof 14 while the seatbelt retractor 18 moves relative to the vehicle roof 14 along the track 16.

The seatbelt retractor 18 may be selectively locked relative to track 16. For example, the system 12 includes a solenoid 66 fixed to the seatbelt retractor 18 and releasably engageable with the track 16. The seatbelt retractor 18 and the solenoid 66 may share a common case and/or the solenoid 66 may be otherwise fixed to the seatbelt retractor 18 in any suitable fashion. The solenoid 66 may be supported by the seatbelt retractor 18. Specifically, the seatbelt retractor 18 may be supported by and engage the track 16, and the solenoid 66 may be supported on the track 16 by the seatbelt retractor 18.

The solenoid 66 moves with the seatbelt retractor 18 relative to the track 16. The solenoid 66 is releasably engageable with the track 16 to lock the seatbelt retractor 18 relative to the track 16. For example, the track 16 may include a plurality of holes 68 engageable by the armature of the solenoid 66 to lock the solenoid 66 and seatbelt retractor 18 relative to the track 16. The holes 68 may be spaced at suitable interval around the track 16.

The system 12 includes a switch 58 that actuates the solenoid 66 fixed to the seatbelt retractor 18. The switch 58 may be on the seat 20. The switch 58 may be any suitable type of switch 58 that receives input from the occupant e.g., a finger-operated mechanical switch 58, a graphical user interface, etc. As one example, the switch 58 may be the same switch 58 that operates the solenoid 56 in the base 48 of the seat 20. As another example, the switch 58 that operates the solenoid 66 fixed to the seatbelt retractor 18 may be separate from the switch 58 that operates the solenoid 56 in the base 48 of the seat 20.

When the switch 58 is activated by an occupant, the switch 58 disengages the solenoid 66 from the track 16 to allow the seatbelt retractor 18 to freely slide relative to the track 16. In the example where the same switch 58 operates both solenoids 56, 66, the activation of the switch 58 by the occupant unlocks the base 48 of the seat 20 to the released position and unlocks the solenoid 66 relative to the track 16 so that the seat 20 can rotate relative to the vehicle floor 26 and the seatbelt retractor 18 may move with the seat 20 relative to the track 16. As set forth above, force pulling on the seatbelt webbing 34 at the guide pulls the seatbelt retractor 18 along the track 16.

Figure 6:
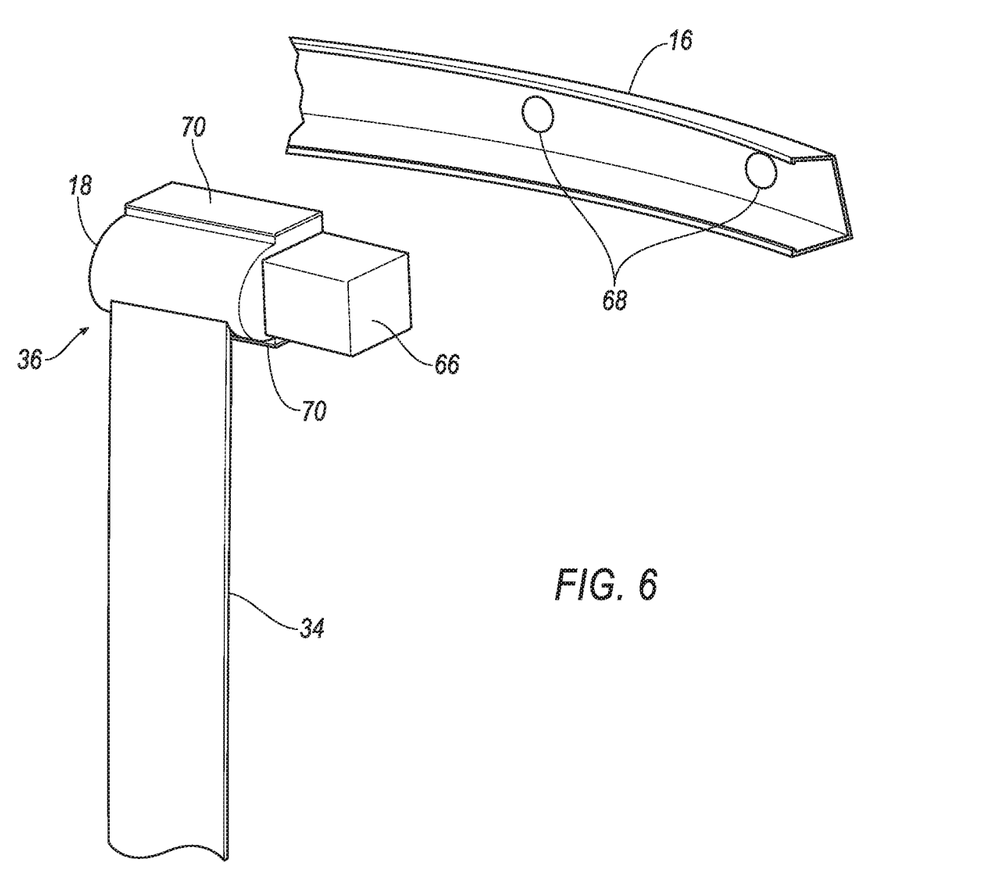
FIG. 6 is a partially exploded view of the seatbelt retractor and the track.
Figure 7:
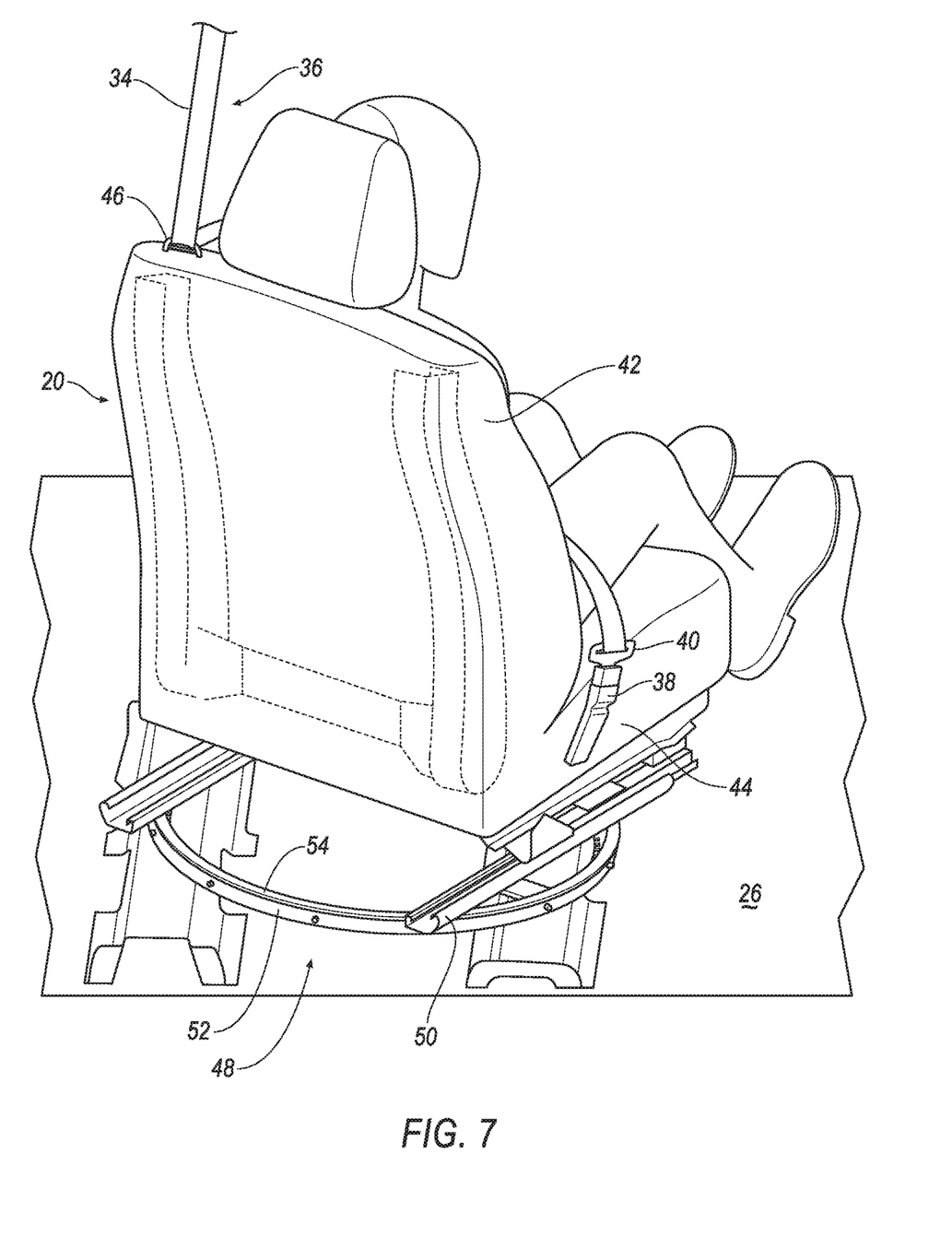
FIG. 7 is a perspective view of the seat.

The system 12 may include a bearing 70 between the track 16 and the seatbelt retractor 18 and/or the solenoid 66. The bearing 70 allows the seatbelt retractor 18 to freely slide along the track 16, e.g., when the seat 20 is rotated and the solenoid 66 is unlocked. The bearing 70 may be supported on the seatbelt retractor 18, as shown for example, in FIGS. 3, 4, and 6. As another example, the bearing 70 may be supported on the track 16. The bearing 70 may be of any suitable type, e.g., ball bearings, needle bearings, and/or low-friction surfaces.

Figure 9:
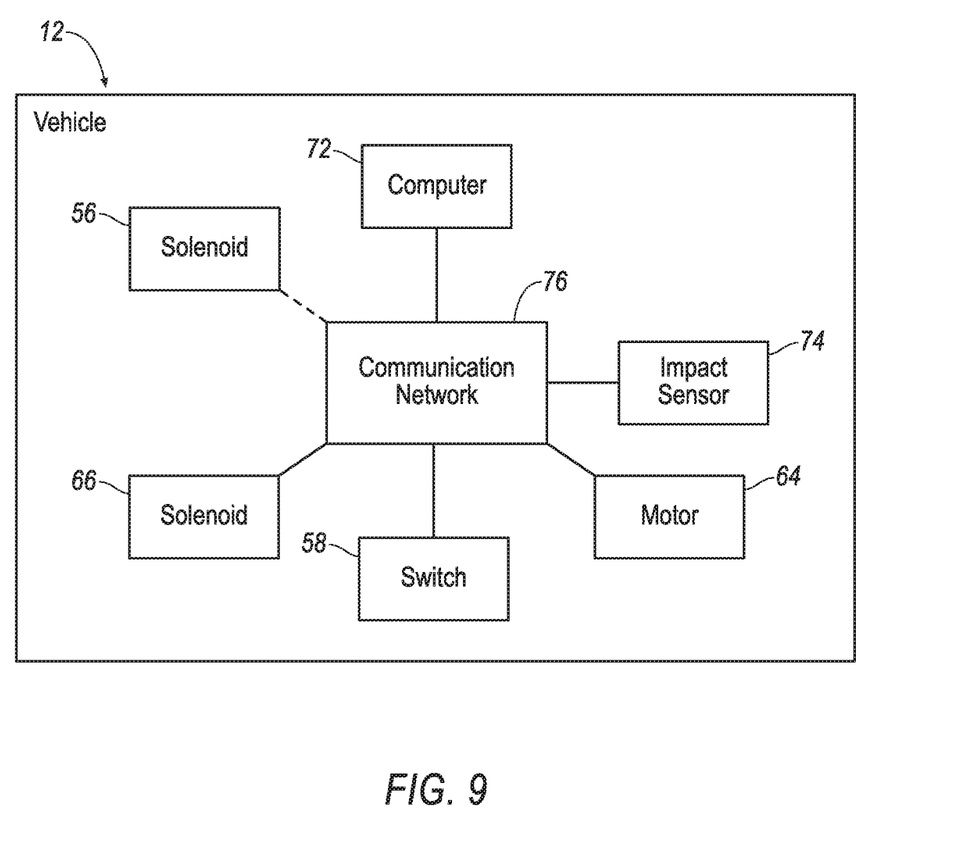
FIG. 9 is a block diagram of a system of the vehicle.

With reference to FIG. 9, the system 12 includes the computer 72, as shown in FIG. 9. The computer 72 includes a processor and a memory. The memory stores instructions executable by the processor.

The vehicle 10 includes an impact sensor 74. The impact sensor 74 may detect different impacts, e.g., a front impact, an oblique impact, a side impact, etc. The impact sensor 74 may be of any suitable type, e.g., post-contact sensors such as accelerometers, pressure sensors, and contact switch 58*es*; and pre-impact sensors such as radar, LIDAR, and vision-sensing system 12*s*. The vision systems may include one or more cameras, CCD image sensors, CMOS image sensors, etc. The vehicle 10 may include a plurality of impact sensors 74 located at numerous points in or on the vehicle 10.

The vehicle 10 may include a communication network 76. FIG. 9 is a block diagram of the communication network 76. The communication network 76 includes hardware, such as a communication bus, for facilitating communication among vehicle components, e.g., the solenoids 56, 66. the switch 58, the impact sensor 74, the computer 72, etc. The communication network 76 may facilitate wired or wireless communication among the vehicle components in accordance with a number of communication protocols such as controller area network (CAN), Ethernet, WiFi, Local Interconnect Network (LIN), and/or other wired or wireless mechanisms. As an example, the solenoids 56, 66 may be wirelessly connected to the communication network.

The computer 72 may be a microprocessor-based computing device implemented via circuits, chips, or other electronic components. For example, the computer may include a processor, memory, etc. The memory of the controller may store instructions executable by the processor as well as data and/or database 48*s*.

The memory may store instruction executable by the processor to detect and identify an impact to the vehicle 10. The computer 72 may identify whether the vehicle 10 has received an impact. The computer 72 may identify an amount of such impact. The computer 72 may make such identifications based on information received from the impact sensor 74 via the communication network.

Figure 10:
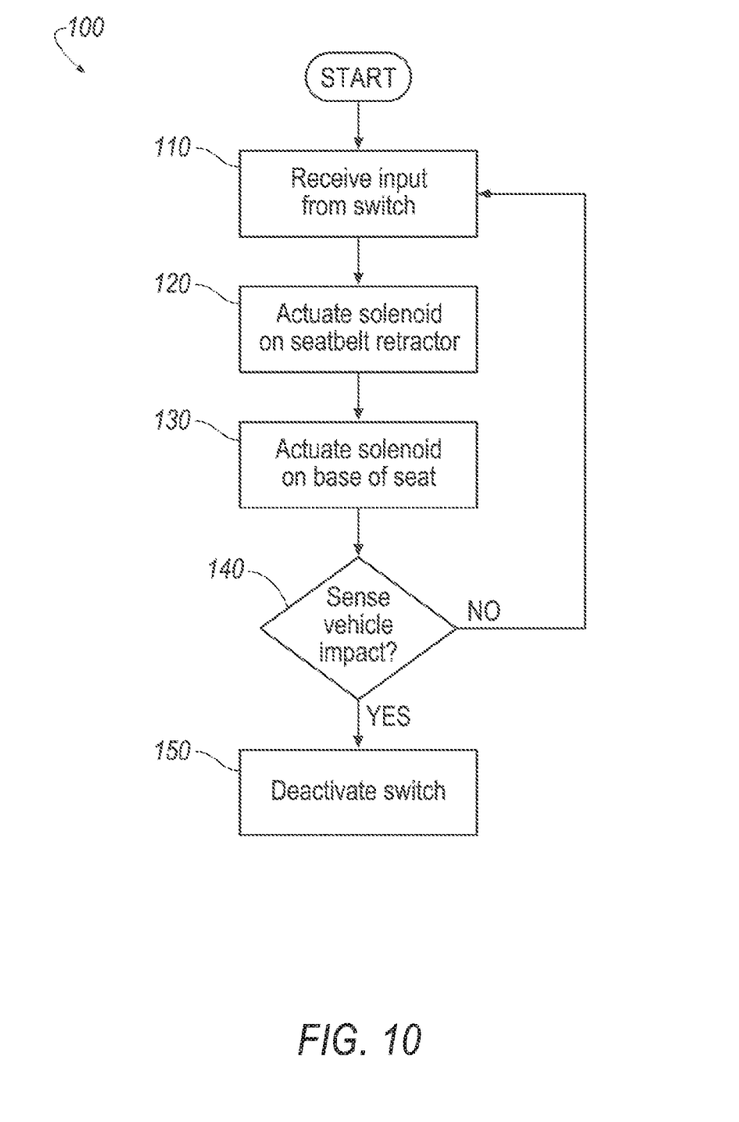
FIG. 10 is a flow chart showing a method of operating the system of the vehicle.

A method 100 is shown in the flow chart in FIG. 10. The method 100 shown in FIG. 10 includes the operation of the switch 58 to disengage the solenoid 66 from the track 16 to allow the seatbelt retractor 18 to move relative to the track 16. In the event of a sensed vehicle 10 impact, the method 100 includes overriding the switch 58 to engage the solenoid 66 with the track 16 to lock the seatbelt retractor 18 relative to the track 16. When locked relative to the track 16, the seatbelt retractor 18 controls payout of the seatbelt webbing 34 during the vehicle 10 impact to control the kinematics of the occupant, e.g., the seatbelt retractor 18 initially locks to prevent payout.

The computer 72 may be programmed with instructions to actuate the solenoid 66 in response to operation of the switch 58. In other words, when the switch 58 is operated, the solenoid 66 is disengaged from the track 16 and the seatbelt retractor 18 freely slides along the track 16. For example, if the seat 20 is rotated, the seatbelt webbing 34 pulls the seatbelt retractor 18 and the seatbelt retractor 18 slides along the track 16. As set forth above, the switch 58 may also control the solenoid 56 in the base 48 of the seat 20. In such an example, the operation of the switch 58 simultaneously disengages the solenoid 66 from the track 16 and disengages the solenoid 56 from the base 48, e.g., the rotatable ring 54.

With reference to block 110 in FIG. 10, the method includes receiving input from the switch 58 and, in block 120, the method includes activating the solenoid 56 in response to receiving input from the switch 58. When activated, the solenoid 56 disengages the track 16. In other words, when the occupant provides input to the switch 58, the computer 72 instructs the solenoid to disengage the track 16.

In the example, where the switch 58 also operates the solenoid 56 in the base 48 of the seat 20, in block 130 the method includes activating the solenoid 56 in response to receiving input from the switch 58. When activated, the solenoid 56 disengages the base 48 of the seat 20, e.g., the rotatable ring 54. In other words, when the occupant provides input to the switch 58, the computer 72 instructs the solenoid 56 to disengage the base 48 of the seat 20, e.g., the rotatable ring 54.

In decision block 140, the method includes determining whether a vehicle impact is sensed. If vehicle impact is not sensed, the switch 58 remains active and is able to control the solenoids 56, 66 to unlock the solenoids 56, 66 from the track 16 and the base 48. If vehicle 10 impact is sensed, the switch 58 is deactivated, as shown in block 150. When the switch 58 is deactivated, the solenoids 56, 66 return to the locked positions. Specifically, when the switch 58 is deactivated, the solenoid 66 engages the track 16 to lock the seatbelt retractor 18 to the track 16. When the switch 58 is deactivated, the solenoid 56 engages the base 48 of the seat 20 to lock the base 48, e.g., to lock the rotatable ring 54 to the fixed ring 52. Accordingly, the seat 20 and the seatbelt retractor 18 are locked in place relative to the vehicle floor 26 and the vehicle roof 14, respectively, during a sensed impact.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments and should in no way be construed so as to limit the disclosed subject matter.

Computing devices, such as the computer 72, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system 12 bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

When the system 12 is in use, the occupant may secure the seatbelt webbing 34 to the buckle 38. The occupant may later activate the switch 58 to rotate the seat 20. The occupant may select a position for the seat 20 to face other occupants or enjoy a panoramic view of the environment outside the vehicle 10. As the seat 20 rotates, the assembly permits the seatbelt webbing 34 to move with the seat 20 and maintain three-point restraint of the occupant. The assembly mounted to the vehicle roof 14 provides a lower weight alternative to a seat 20 integrated restraint system 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a vehicle roof;
   a track fixed to the vehicle roof;
   a seatbelt retractor engaged with the track and movable relative to the vehicle roof along the track;
   a seat rotatable about an axis that extends through the seat and the vehicle roof;
   the seat including a seat back having an upper end and a webbing guide at the upper end; and
   a seatbelt webbing extending from the retractor through the webbing guide.

2. The system of claim 1, wherein the seatbelt webbing includes an end anchored to the seat.

3. The system of claim 1, further comprising a vehicle floor and a seat track fixed to the vehicle floor, the seat being rotatable relative to the seat track.

4. The system of claim 3, further comprising a solenoid fixed to one of the seat and the seat track and releasably engageable with the other of the seat and the seat track.

5. The system of claim 4, further comprising a processor and a memory storing instructions to actuate the solenoid in response to operation of a switch.

6. The system of claim 4, further comprising a second solenoid fixed to the seatbelt retractor and releasably engageable with the track.

7. The system of claim 6, further comprising a processor and a memory storing instructions to simultaneously actuate the solenoid and the second solenoid in response to operation of a switch.

8. The system of claim 1, wherein the track is continuous.

9. The system of claim 1, further comprising a bearing between the track and the seatbelt retractor.

10. The system of claim 1, further comprising a solenoid fixed to the seatbelt retractor and releasably engageable with the track.

11. The system of claim 10, further comprising a processor and a memory storing instructions to actuate the solenoid in response to operation of a switch.

12. The system of claim 10, further comprising a processor and a memory storing instructions to actuate the solenoid in response to a vehicle impact.

13. The system of claim 10, further comprising a processor and a memory storing instructions to actuate the solenoid in response to a vehicle impact.

14. A system, comprising:
    a track; and
    a seatbelt retractor slideably engaged with the track;
    a solenoid fixed to one of the seatbelt retractor and the track and releasably engageable with the other of the seatbelt retractor and the track.

15. The system of claim 14, further comprising a processor and a memory storing instructions to actuate the solenoid in response to operation of a switch.

16. The system of claim 14, wherein the track is circular.

17. A system comprising:
    a vehicle roof;
    a track fixed to the vehicle roof;
    a seatbelt retractor engaged with the track and movable relative to the vehicle roof along the track; and
    a solenoid fixed to the seatbelt retractor and releasably engageable with the track.

18. The system of claim 17, further comprising a processor and a memory storing instructions to actuate the solenoid in response to a vehicle impact.

19. The system of claim 17, further comprising a seatbelt webbing extending from the seatbelt retractor to the seat.

20. The system of claim 17, wherein the track is continuous.

* * * * *